(12) United States Patent
Sorensen

(10) Patent No.: US 11,324,164 B2
(45) Date of Patent: May 10, 2022

(54) SYSTEM AND DEVICE FOR MONITORING A CONDITION OF A SICKLE SECTION OF AN AGRICULTURAL MACHINE

(71) Applicant: CNH Industrial America LLC, New Holland, PA (US)

(72) Inventor: Doug Sorensen, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 378 days.

(21) Appl. No.: 16/537,846

(22) Filed: Aug. 12, 2019

(65) Prior Publication Data

US 2021/0045288 A1 Feb. 18, 2021

(51) Int. Cl.
| *A01D 41/127* | (2006.01) |
| *A01D 34/00* | (2006.01) |
| *A01D 34/14* | (2006.01) |
| *A01D 34/18* | (2006.01) |

(52) U.S. Cl.
CPC ......... *A01D 41/127* (2013.01); *A01D 34/006* (2013.01); *A01D 34/14* (2013.01); *A01D 34/18* (2013.01)

(58) Field of Classification Search
CPC .... A01D 41/127; A01D 34/006; A01D 34/14; A01D 34/18; A01D 34/30; A01D 41/1274; A01D 29/095; A01D 29/22; A01D 43/085; A01F 29/22; B24B 49/10; B24B 3/363
See application file for complete search history.

(56) References Cited

U.S. PATENT DOCUMENTS

| 6,255,812 | B1 | 7/2001 | Voigt et al. |
| 6,931,828 | B2 * | 8/2005 | Kormann ............. A01D 41/127 56/250 |
| 7,401,458 | B2 | 7/2008 | Priepke |
| 7,950,212 | B1 | 5/2011 | Figgins et al. |
| 2017/0127611 | A1 | 5/2017 | Dunn et al. |
| 2017/0265383 | A1 * | 9/2017 | Cook ..................... A01D 34/30 |
| 2019/0090422 | A1 | 3/2019 | Deevy |

FOREIGN PATENT DOCUMENTS

| DE | 102011055851 A1 * | 11/2012 | ............. B24B 3/368 |
| DE | 102015120564 A1 * | 6/2017 | ............. A01F 29/22 |
| DE | 102016207565 A1 * | 11/2017 | ............. A01D 90/04 |
| DE | 202017102817 U1 * | 8/2018 | ............. A01D 34/13 |
| EP | 2008508 A1 | 12/2008 | |
| EP | 2272318 A1 * | 1/2011 | ............. A01F 29/22 |
| EP | 2436258 A1 * | 4/2012 | ........... A01D 43/085 |
| EP | 3108736 A1 | 12/2016 | |
| EP | 3118575 A1 | 1/2017 | |
| EP | 3284334 A1 | 2/2018 | |
| WO | 2009/136275 A1 | 11/2009 | |

OTHER PUBLICATIONS

International Search Report and Written Opinion for PCT application PCT/US2020/045995, dated Oct. 22, 2020 (12 pages).

* cited by examiner

*Primary Examiner* — Arpad Fabian-Kovacs
(74) *Attorney, Agent, or Firm* — Peter Zacharias; Patrick Sheldrake

(57) ABSTRACT

A system for monitoring a condition of a sickle of a header of an agricultural machine. The system includes a knife guard mounted to the header, a knife section of the sickle that is configured to move either along or with respect to a surface of the knife guard, and a sensor either mounted to the knife guard or another surface of the header for sensing the condition of the knife section.

17 Claims, 4 Drawing Sheets

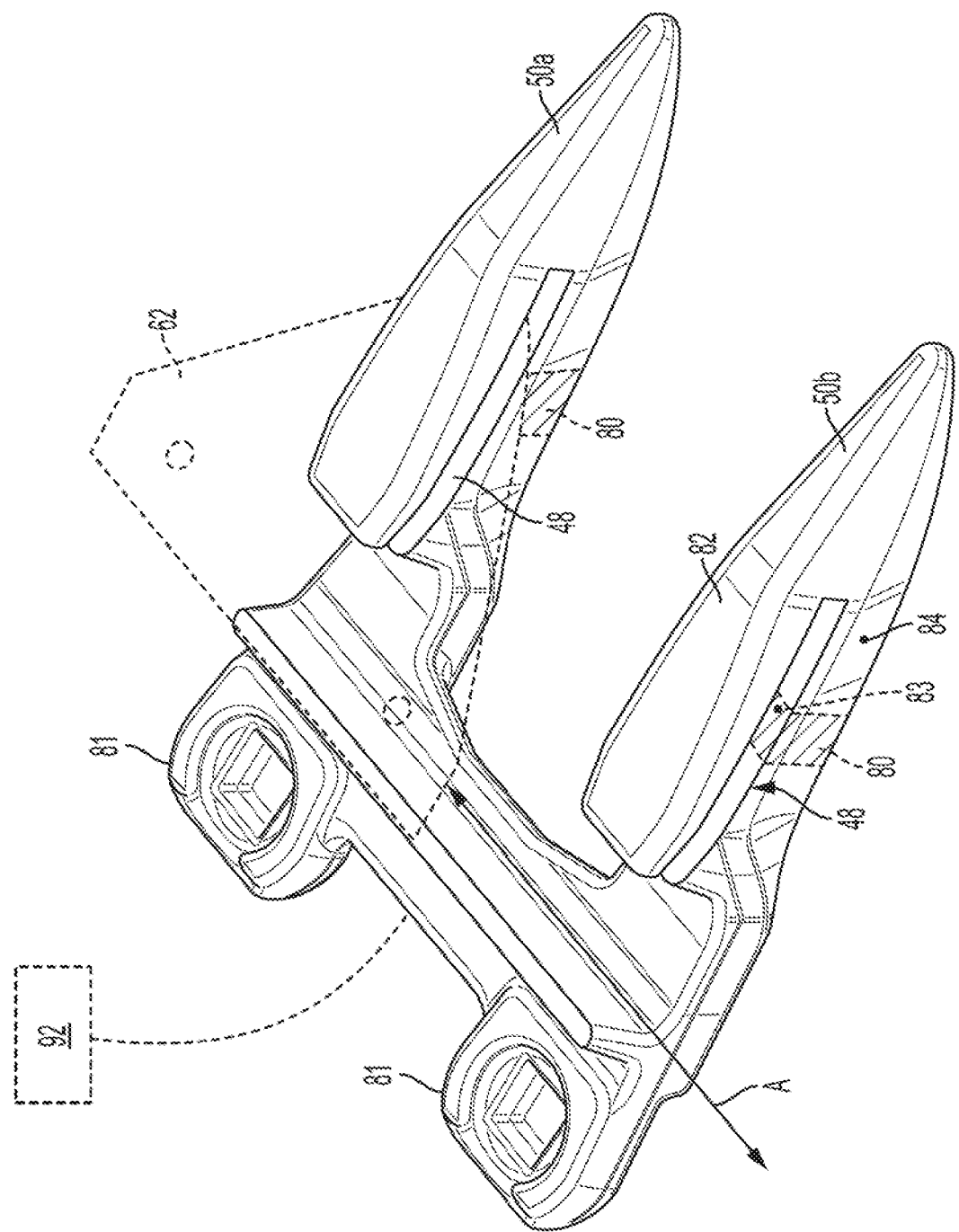

US 11,324,164 B2

SYSTEM AND DEVICE FOR MONITORING A CONDITION OF A SICKLE SECTION OF AN AGRICULTURAL MACHINE

FIELD OF THE INVENTION

The present invention relates generally to a system for monitoring a condition of a sickle of a header of an agricultural cutting machine, such as a combine, windrower or other crop harvesting machine.

BACKGROUND OF THE INVENTION

As is described in U.S. Pat. No. 7,401,458 to CNH America LLC, which is incorporated by reference herein in its entirety and for all purposes, sickles have been used to cut plants, including, but not limited to, hay, grasses, small grains and the like, for many years. Sickles typically include cutter bars supporting a row of knives. The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

If one or more of the knife sections of the sickle were to break off during normal operation, then uncut crop would result, which represents a loss for the operator of the machine. This is especially true for a fully-autonomous agricultural machine where an operator of the machine does not normally view the cutting operation as it occurs and such a loss would not be realized until after a harvesting operation has been completed.

Thus, it would be advantageous to actively monitor the condition (or, more generally, the presence) of the individual knife sections of the sickle during operation of the agricultural cutting machine.

SUMMARY OF THE INVENTION

According to one aspect of the invention, a system for monitoring a condition of a sickle of a header of an agricultural machine comprises a knife guard mounted to the header; a knife section of the sickle that is configured to move either along or with respect to a surface of the knife guard; and a sensor either mounted to the knife guard or another surface of the header for sensing the condition of the knife section.

According to another aspect of the invention, a method of monitoring a condition of a sickle of a header of an agricultural machine comprises the steps of: sensing the condition of a knife section of the sickle using a sensor that is mounted to the header; transmitting a signal indicative of the sensed condition of the knife section to either a controller or a processor of the agricultural machine; and identifying that the sensed condition is an irregular condition by comparing the signal against a threshold value.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 4 is a simplified isometric View of a single knife section positioned within a slot of a guard, which forms part of a larger system for monitoring a condition of the sickle.

FIG. 5 is a flow chart depicting the operational steps for monitoring the condition of the sickle.

DETAILED DESCRIPTION OF THE INVENTION

Figure 1:
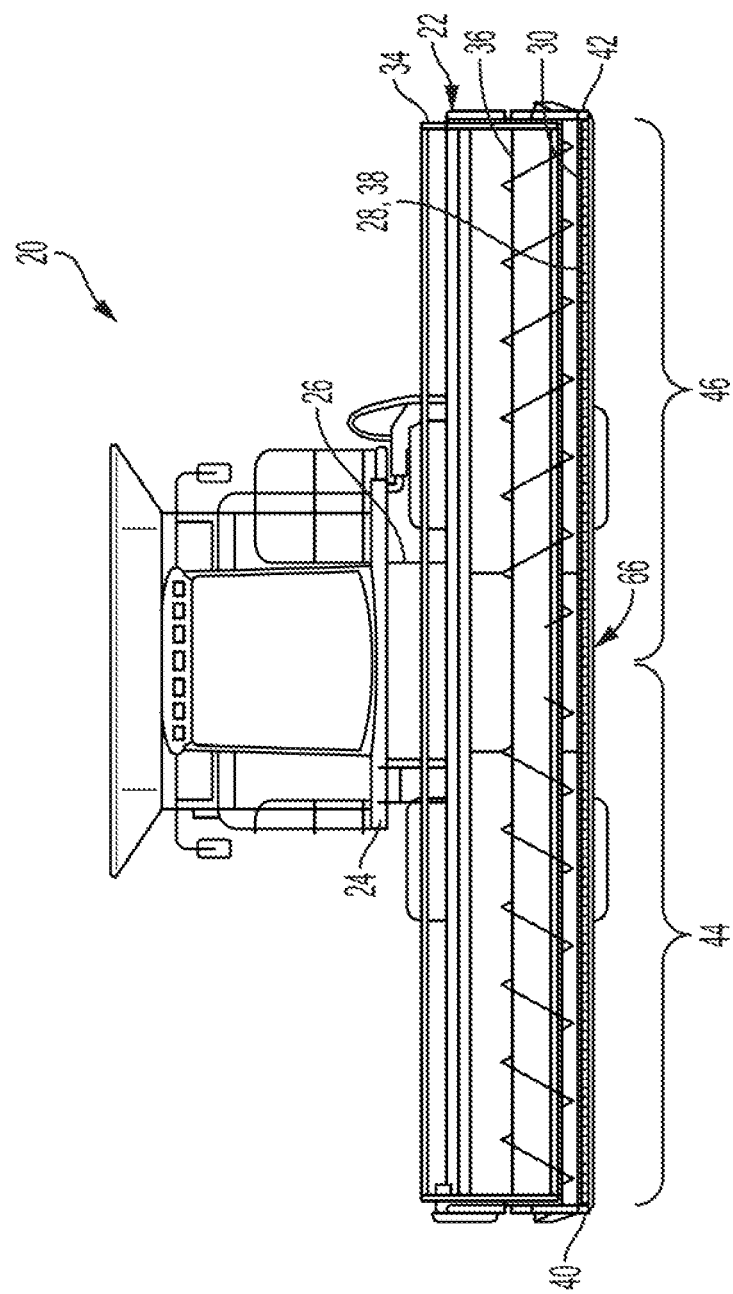
FIG. 1 is a forward end view of a combine including a header having a sickle drive mechanism.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting. The terms "longitudinal" and "transverse" are determined with reference to the fore-and-aft direction of the combine and are equally not to be construed as limiting.

Figure 2:
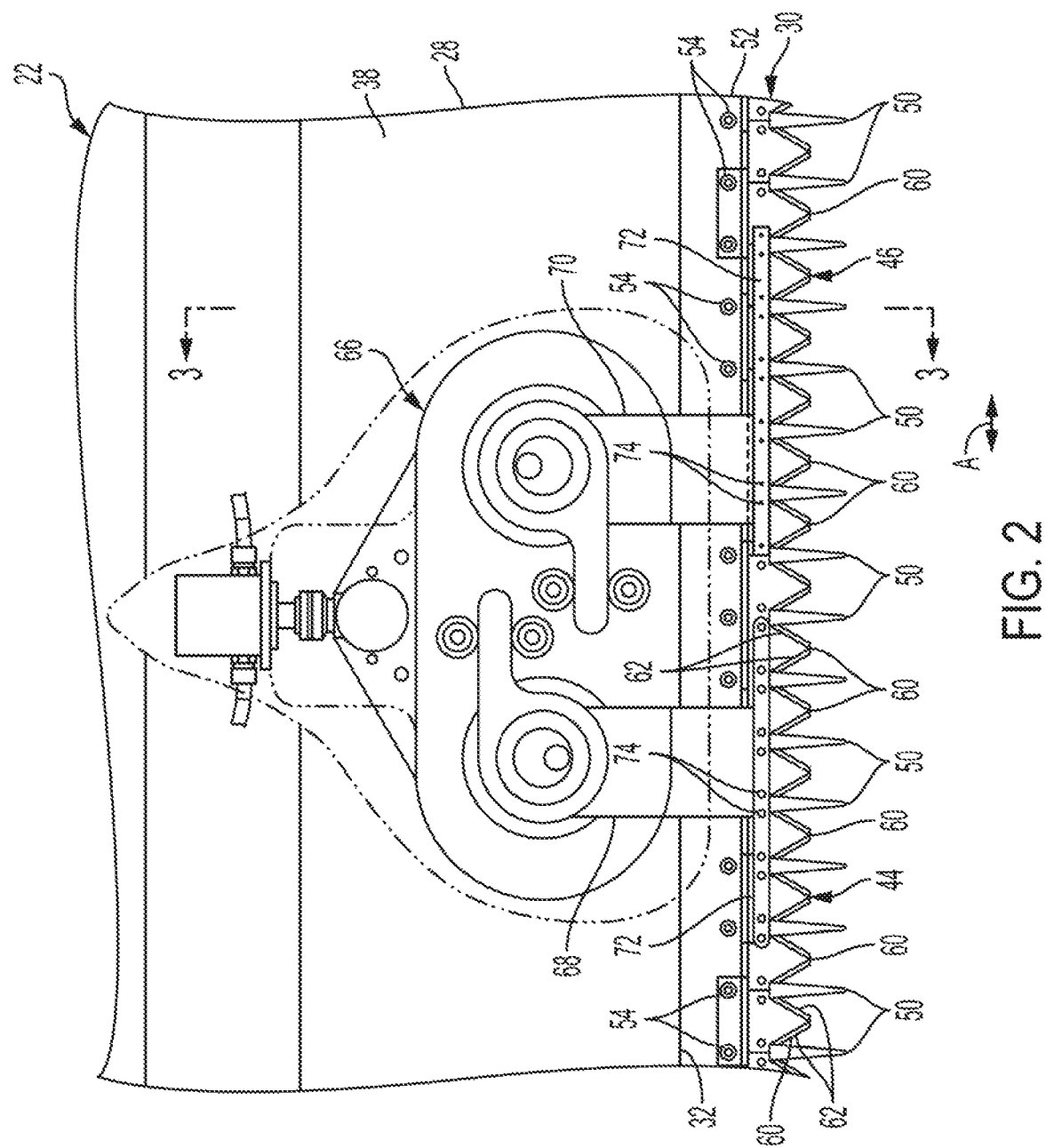
FIG. 2 is an enlarged fragmentary top view of the header of FIG. 1, with a cover and an upper bearing assembly removed to show other aspects of the sickle drive mechanism of FIG. 1.
Figure 3:
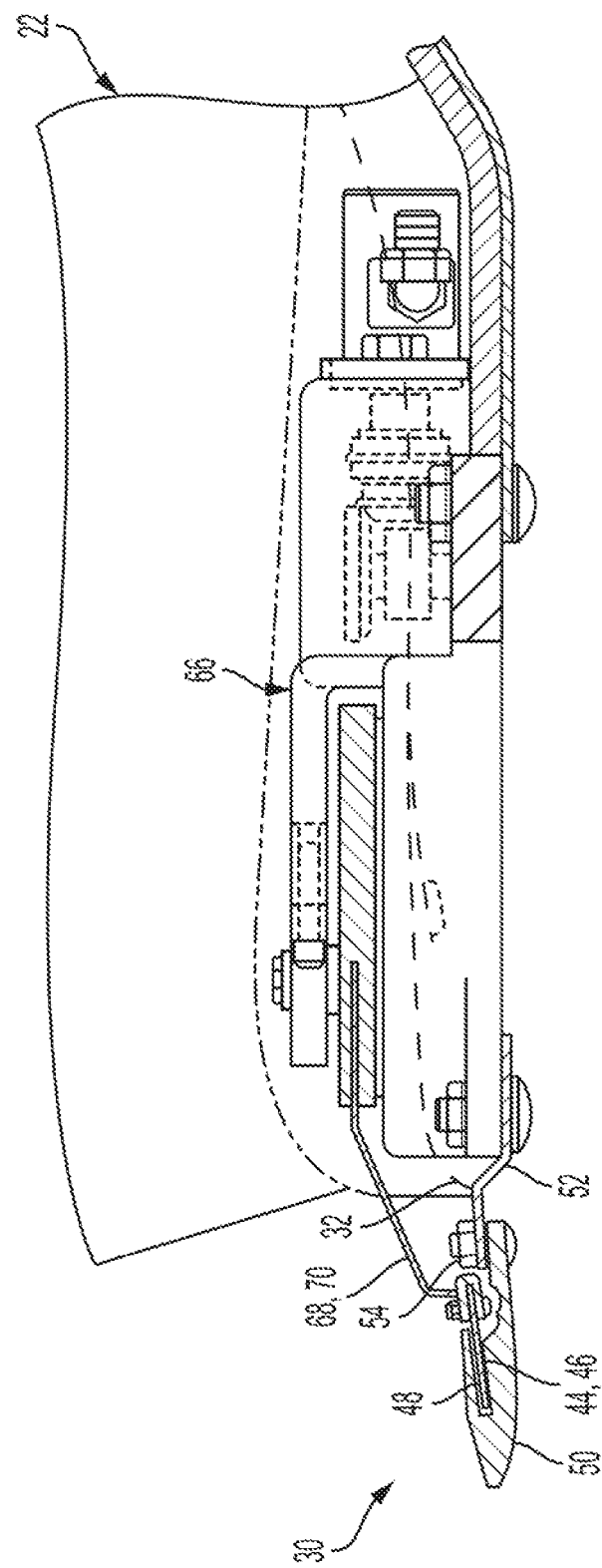
FIG. 3 is an enlarged fragmentary sectional view of the header taken generally along line 3-3 of FIG. 2, and with the cover and a floor of the header in phantom to reveal the sickle drive mechanism.

Referring now to the drawings, as is described in U.S. Pat. No. 7,401,458, FIGS. 1-3 depict an agricultural cutting machine, which is a combine 20 including a header 22. Header 22 is shown supported on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well-known manner, as combine 20 moves forwardly over a field.

The header 22 includes a pan or floor 28 which is supported in desired proximity to the surface of the field during the harvesting operation, and an elongate, sidewardly extending sickle 30 along a forward edge portion 32 of floor 28. The sickle 30 is operable for severing the crop for induction into header 22, as will be explained. Header 22 additionally includes an elongate, sidewardly extending reel 34 disposed above sickle 30 and rotatable in a direction for facilitating induction of the severed crops into header 22. An elongate, rotatable auger 36 (shown in outline form in FIG. 1), which extends in close proximity to a top surface 38 of floor 28 and has helical flights therearound, is operable in cooperation with reel 34 for conveying the severed crops toward an inlet opening of feeder 26 for induction into combine 20, in the well-known manner.

Referring more particularly to FIG. 1, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44. The cutter bar assemblies 44 and 46 are supported in substantially longitudinally aligned relation adjacent to forward edge portion 32 of floor 28.

Referring more particularly to FIGS. 2 and 3, cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 58 at the bottom of header 22, as also illustrated in FIG. 3. Each of cutter bar assemblies 44 and 46 supports an elongate knife assembly 60 for reciprocating longitudinal movement within slots 48. Each knife assembly 60 includes a row of knife sections 62 including oppositely facing, angularly related knife edges which, in conjunction with adjacent guards 50, effects a shearing or cutting action which severs plant stems and stalks or other material captured between the knives and the guards as the knife sections are reciprocatingly moved sidewardly, as denoted by arrows A.

A sickle drive mechanism 66 includes a first knife head driver element 68 in connection with the knife assembly 60 of first cutter bar assembly 44, and a second knife head driver element 70 in connection with the knife assembly 60 of second cutter bar assembly 46. Knife head driver elements 68 and 70 are simultaneously operable by drive mechanism 66 for reciprocatingly driving the knife head assemblies 60 of respective cutter bar assemblies 44 and 46 sidewardly, as illustrated by arrows A, in timed relation so as to move in opposite sideward directions. That is, as knife head assembly 60 of first cutter bar assembly 44 is moved in one sideward direction, knife head assembly 60 of second cutter bar assembly 46 will be moved in the opposite sideward direction. The length of the sideward movements, or strokes, will be sufficient for providing the desired cutting action, which will typically be equal to about the sideward extent of a knife edge of a typical knife section 62. Further details of the sickle drive mechanism 66 are described in U.S. Pat. No. 7,401,458.

First and second knife head driver elements 68 and 70 are preferably constructed of a sheet or cast metal bent or formed to a sectional shape about as shown, and are connected to knife assemblies 60 of the respective cutter bar assemblies 44 and 46 in a suitable manner, here using sidewardly extending elongate bars 72 on the forward ends of driver elements 68 and 70, which connect to the knife assemblies 60 with suitable fasteners such as screws 74 or the like. Here, it should be noted that it is desired for the knife head assemblies 60 to move only in the sideward directions relative to stationary bar 52, and not forwardly, rearwardly, upwardly or downwardly to any significant extent relative thereto. This is achieved at least in large part by the containment of knife head assemblies 60 in slots 48 of stationary bar 52, although other constructions for holding the knife head assemblies could be used. Because driver elements 68 and 70 are rigidly connected with knife head assemblies 60, respectively, the driver elements 68 and 70 are also restricted to sideward movements only.

As noted in the Background section, if one or more of the knife sections 62 of the sickle 30 were to break off during normal operation, then uncut crop would result, which represents a loss for the operator of the machine. This is especially true for a fully-autonomous agricultural machine where an operator of the machine does not normally view the cutting operation as it occurs and such a loss would not be realized until after a harvesting operation has been completed.

Thus, it would be advantageous to actively monitor the condition (or, more generally, the presence) of the individual knife sections 62 of the sickle 30 during operation of the agricultural cutting machine.

Turning now to FIG. 4, which is a simplified isometric view of a single knife section 62 positioned within a slot 48 of a guard 50a, each guard assembly includes a section 81 for mounting to the stationary bar 52 (see FIG. 3), and two guards 50a and 50b extending forwardly from the section 81. It should be understood that multiple guard assemblies are mounted to the bar 52. Each guard 50 is an elongated body that projects to a pointed end. The rectangular slot 48 extends transversely through each guard 50 to thereby define a top tang 82 and a lower body 84 positioned beneath the top tang 82. The opposing surfaces of each slot 48 are planar, and are separated by a gap that is sufficient to permit the passage of the knife section 62 therewithin. In operation, the knife section 62 is configured to move in the slots 48 and between the adjacent guards 50a and 50b, as denoted by arrows A.

As shown in FIG. 4, sensors 80 are mounted to the guards 50. Each sensor 80 detects the condition, presence or absence of the knife section 62 as the knife section 62 passes within the slot 48 of a respective guard 50. The sensor 80 could be, for example, an electric eye, a miniature camera, a Hall-Effect sensor, a magnetic sensor, a proximity sensor, or a movable contact, by way of example, or any other known sensor that is configured to detect the presence or absence of an object. Every guard 50 of the header 22 (FIG. 1) could have its own sensor 80, or alternatively, every other guard 50 in a row of guards 50 may have a sensor 80.

The sensor 80 is fixedly mounted to the lower body 84 of the guard 50, and the sensing section 83 of the sensor is exposed to the slot 48. Alternatively, the sensor 80 may be mounted to the top tang 82, the mounting section 81, or any other surface of the header 22 (FIG. 1), so long as the sensor 80 is configured to detect the condition, presence or absence of the knife section 62. For example, in a stub guard that does not include a slot formed in a unitary guard component, the sensor 80 may be positioned on a surface of the stub guard adjacent the blade sections. The sensor 80 may be configured to detect the sharpened or dulled condition of the blade sections of the knife section 62, especially if the sensor 80 is a camera.

In operation, when a knife section 62 has become detached, bent, deformed, broken, chipped, dulled or otherwise impaired beyond a predetermined threshold, the sensor 80 detects the same. More particularly, each sensor 80 continuously transmits signals that are representative of the condition of the knife section 62 to a processor or controller 92 as the knife section 62 moves through the slot 48 that is associated with the sensor 80. The impaired knife section 62 is represented within the signal as a deviation in any one of the wavelength, amplitude, period, or frequency of the signal, for example, by more than a threshold value. The signal may be either analog or digital. The controller 92 is configured to detect the impaired condition of the knife section 62 based upon the received signal and using an algorithm. If the sensor 80 is a camera, for example, the controller 92 may be configured to compare a digital image of the knife section 62 with a representative stock image of a flawless knife section.

Once the controller 92 identifies that the knife section 62 is impaired, the controller 92 alerts the user to the impaired condition of the knife section 62 by way of a visual or audible signal, for example. For example, the controller 92 may transmit an error message to a display monitor in a cab of the vehicle, or to an external computer, for example. The error message may identify the particular knife section 62 of the header by a unique number to enable a user to rapidly locate the impaired knife section 62 on the header 22.

FIG. 5 is a flow chart depicting the operational steps for monitoring the condition of the sickle, according to one exemplary method. At step 100, the method comprises sensing the condition of the knife section 62 of the sickle 30 using the sensor 80. At step 102, the method comprises transmitting a signal indicative of the sensed condition of the knife section 80 to either the controller 92 or a processor. At step 104, the method comprises identifying that the sensed condition is an irregular condition by comparing the signal against a threshold value. The sensed condition of the knife section 62 may comprise the presence, absence, sharpness, dullness, shape, and/or planarity of the knife section 62. At step 106, the method comprises communicating the irregular condition in an error message to an end user of the agricultural machine. The error message, which is either visual or audible, may include an identifier for the knife section 62.

It is to be understood that the operational steps are performed by the controller 92 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 92 described herein is implemented in software code or instructions which are tangibly stored on a tangible computer readable medium. Upon loading and executing such software code or instructions by the controller 92, the controller 92 may perform any of the functionality of the controller 92 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

In light of all the foregoing, it should thus be apparent to those skilled in the art that there has been shown and described a control system for monitoring a condition of a sickle of a header of an agricultural cutting machine. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A system for monitoring a condition of a sickle of a header of an agricultural machine, said system comprising:
   a knife guard mounted to the header;
   a knife section of the sickle that is configured to move either along or with respect to a surface of the knife guard; and
   a sensor at least partially embedded within the knife guard for sensing an absence of the knife section in an event where the knife section becomes detached from the sickle.

2. The system of claim 1, wherein the knife guard is positioned forward of the knife section, as viewed in a direction of travel of the agricultural machine.

3. The system of claim 1, wherein the guard includes a slot through which the knife section passes.

4. The system of claim 3, wherein the sensor is at least partially embedded within the slot of the knife guard.

5. The system of claim 1, wherein the sensor is connected to a processor, and the processor is configured to determine a condition of the knife section based upon a signal transmitted by the sensor.

6. The system of claim 1, wherein the sensor comprises one of an electric eye, a camera, a Hall-Effect sensor, a magnetic sensor, a proximity sensor, and a movable contact.

7. The system of claim 1, further comprising a plurality of the knife guards and a plurality of the sensors, wherein each of the plurality of knife guards includes one of the plurality of sensors.

8. The system of claim 1, wherein the sensor is configured to transmit a signal indicative of the absence of the knife.

9. The system of claim 1, further comprising a sickle drive mechanism for moving the knife section in a reciprocating fashion.

10. The system of claim 1, wherein a sensing portion of the sensor is positioned to face the knife section for sensing the condition of the knife section.

11. A header for a combine comprising the system of claim 1.

12. The system of claim 1, wherein the knife section is a knife blade.

13. A method of monitoring a condition of a sickle of a header of an agricultural machine, wherein the sickle includes a reciprocating knife section and a knife guard positioned adjacent the reciprocating knife section, said method comprising the steps of:
   sense an absence of a knife section of the sickle, using a sensor that is embedded within the knife guard, in an event where the knife section becomes detached from the sickle;
   transmitting a signal indicative of the sensed absence of the knife section to either a controller or a processor of the agricultural machine; and
   identifying that the sensed absence is an irregular condition by comparing the signal against a threshold value.

14. The method of claim 13 further comprising communicating the irregular condition in an error message to an end user of the agricultural machine.

15. The method of claim 14 further comprising communicating an identifier for the knife section associated with the irregular condition to the end user.

16. The method of claim 14, wherein the error message is either visual or audible.

17. The method of claim 13, wherein the knife section is a knife blade.

* * * * *